(12) United States Patent
Bour et al.

(10) Patent No.: US 7,270,183 B2
(45) Date of Patent: Sep. 18, 2007

(54) CEMENTING METHODS USING COMPRESSIBLE CEMENT COMPOSITIONS

(75) Inventors: Daniel L. Bour, Bakersfield, CA (US); Michael D. McMillion, Bakersfield, CA (US)

(73) Assignee: Halliburton Energy Services, Inc., Duncan, OK (US)

(*) Notice: Subject to any disclaimer, the term of this patent is extended or adjusted under 35 U.S.C. 154(b) by 256 days.

(21) Appl. No.: 10/990,170

(22) Filed: Nov. 16, 2004

(65) Prior Publication Data

US 2006/0102350 A1  May 18, 2006

(51) Int. Cl.
*E21B 33/16* (2006.01)
*E21B 33/14* (2006.01)

(52) U.S. Cl. ............... 166/291; 166/285; 166/292; 166/293; 166/309; 106/672; 106/677; 106/808; 106/820

(58) Field of Classification Search ............... 166/285, 166/291, 292, 293, 309; 507/672, 677, 808, 507/820
See application file for complete search history.

(56) References Cited

U.S. PATENT DOCUMENTS

| | | | |
|---|---|---|---|
| 2,223,509 A | 12/1940 | Brauer | |
| 2,230,589 A | 2/1941 | Driscoll | |
| 2,407,010 A | 9/1946 | Hudson | |
| 2,472,466 A | 6/1949 | Counts et al. | |
| 2,647,727 A | 8/1953 | Edwards | |
| 2,675,082 A | 4/1954 | Hall | |
| 2,849,213 A | 8/1958 | Failing | |
| 2,919,709 A | 1/1960 | Schwegman | |
| 3,051,246 A | 8/1962 | Clark, Jr. et al. | |
| 3,097,691 A * | 7/1963 | Smith | 166/291 |
| 3,193,010 A * | 7/1965 | Bielstein | 166/285 |
| 3,277,962 A | 10/1966 | Flickinger et al. | |
| 3,412,795 A * | 11/1968 | Terry | 166/285 |
| 3,570,596 A | 3/1971 | Young | |
| 3,948,322 A | 4/1976 | Baker | |

(Continued)

FOREIGN PATENT DOCUMENTS

EP     0 419 281 A2    3/1991

(Continued)

OTHER PUBLICATIONS

Griffith, et al., Reverse Circulation of Cement on Primary Jobs Increases Cement Column Height Across Weak Formations, Society of Petroleum Engineers, SPE 25440, 315-319, Mar. 22-23, 1993.

(Continued)

*Primary Examiner*—George Suchfield
(74) *Attorney, Agent, or Firm*—Craig W. Roddy; Baker Botts

(57) ABSTRACT

A method of cementing at least two casing strings in a well bore, the method having steps as follows: filling the well bore and the inner diameters of the at least two casing strings with a cement composition, wherein at least a portion of the cement composition is a compressible cement composition; pumping the cement composition from the inner diameters of the at least two casing strings into the annulus, wherein the compressible portion of the cement composition is compressed by the pumping; and permitting the cement composition to set within the annulus.

46 Claims, 9 Drawing Sheets

U.S. PATENT DOCUMENTS

| | | |
|---|---|---|
| 3,948,588 A | 4/1976 | Curington et al. |
| 3,951,208 A | 4/1976 | Delano |
| 4,105,069 A | 8/1978 | Baker |
| 4,271,916 A | 6/1981 | Williams |
| 4,300,633 A | 11/1981 | Stewart |
| 4,304,298 A | 12/1981 | Sutton ............... 166/293 |
| 4,340,427 A | 7/1982 | Sutton |
| 4,367,093 A | 1/1983 | Burkhalter et al. |
| RE31,190 E | 3/1983 | Detroit et al. |
| 4,450,010 A | 5/1984 | Burkhalter et al. |
| 4,457,379 A | 7/1984 | McStravick |
| 4,469,174 A | 9/1984 | Freeman |
| 4,519,452 A | 5/1985 | Tsao et al. |
| 4,531,583 A | 7/1985 | Revett |
| 4,548,271 A | 10/1985 | Keller |
| 4,555,269 A | 11/1985 | Rao et al. |
| 4,565,578 A | 1/1986 | Sutton et al. |
| 4,655,286 A * | 4/1987 | Wood ............... 166/285 |
| 4,671,356 A | 6/1987 | Barker et al. |
| 4,676,832 A | 6/1987 | Childs et al. |
| 4,729,432 A | 3/1988 | Helms |
| 4,791,988 A | 12/1988 | Trevillion |
| 4,961,465 A | 10/1990 | Brandell |
| 5,024,273 A | 6/1991 | Coone et al. ............... 166/289 |
| 5,117,910 A | 6/1992 | Brandell et al. |
| 5,125,455 A | 6/1992 | Harris et al. |
| 5,133,409 A * | 7/1992 | Bour et al. ............... 166/293 |
| 5,147,565 A | 9/1992 | Bour et al. |
| 5,188,176 A * | 2/1993 | Carpenter ............... 166/285 |
| 5,213,161 A | 5/1993 | King et al. |
| 5,273,112 A | 12/1993 | Schultz |
| 5,297,634 A | 3/1994 | Loughlin |
| 5,318,118 A | 6/1994 | Duell |
| 5,323,858 A | 6/1994 | Jones et al. |
| 5,361,842 A | 11/1994 | Hale et al. |
| 5,484,019 A | 1/1996 | Griffith |
| 5,494,107 A | 2/1996 | Bode ............... 166/285 |
| 5,507,345 A | 4/1996 | Wehunt, Jr. et al. |
| 5,559,086 A | 9/1996 | Dewprashad et al. |
| 5,571,281 A | 11/1996 | Allen |
| 5,577,865 A | 11/1996 | Manrique et al. |
| 5,641,021 A | 6/1997 | Murray et al. |
| 5,647,434 A | 7/1997 | Sullaway et al. |
| 5,671,809 A | 9/1997 | McKinzie |
| 5,718,292 A | 2/1998 | Heathman et al. |
| 5,738,171 A | 4/1998 | Szarka |
| 5,749,418 A | 5/1998 | Mehta et al. |
| 5,762,139 A | 6/1998 | Sullaway et al. |
| 5,803,168 A | 9/1998 | Lormand et al. |
| 5,829,526 A | 11/1998 | Rogers et al. |
| 5,875,844 A | 3/1999 | Chatterji et al. |
| 5,890,538 A | 4/1999 | Beirute et al. ............... 166/285 |
| 5,897,699 A | 4/1999 | Chatterji et al. |
| 5,900,053 A | 5/1999 | Brothers et al. |
| 5,913,364 A | 6/1999 | Sweatman |
| 5,968,255 A | 10/1999 | Mehta et al. |
| 5,972,103 A | 10/1999 | Mehta et al. |
| 6,060,434 A | 5/2000 | Sweatman et al. |
| 6,063,738 A | 5/2000 | Chatterji et al. ............... 507/269 |
| 6,098,710 A | 8/2000 | Rhein-Knudsen et al. |
| 6,138,759 A | 10/2000 | Chatterji et al. |
| 6,143,069 A | 11/2000 | Brothers et al. |
| 6,167,967 B1 | 1/2001 | Sweatman |
| 6,196,311 B1 | 3/2001 | Treece |
| 6,204,214 B1 | 3/2001 | Singh et al. |
| 6,244,342 B1 | 6/2001 | Sullaway et al. ............... 166/285 |
| 6,258,757 B1 | 7/2001 | Sweatman et al. |
| 6,311,775 B1 | 11/2001 | Allamon et al. |
| 6,318,472 B1 | 11/2001 | Rogers et al. |
| 6,367,550 B1 * | 4/2002 | Chatterji et al. ............... 166/293 |
| 6,431,282 B1 | 8/2002 | Bosma et al. |
| 6,454,001 B1 | 9/2002 | Thompson et al. |
| 6,457,524 B1 | 10/2002 | Roddy |
| 6,467,546 B2 | 10/2002 | Allamon et al. |
| 6,481,494 B1 | 11/2002 | Dusterhoft et al. |
| 6,484,804 B2 | 11/2002 | Allamon et al. |
| 6,488,088 B1 | 12/2002 | Kohli et al. ............... 166/285 |
| 6,488,089 B1 | 12/2002 | Bour et al. |
| 6,488,763 B2 | 12/2002 | Brothers et al. |
| 6,540,022 B2 | 4/2003 | Dusterhoft et al. |
| 6,622,798 B1 | 9/2003 | Rogers et al. |
| 6,666,266 B2 | 12/2003 | Starr et al. |
| 6,679,336 B2 | 1/2004 | Musselwhite et al. |
| 6,715,553 B2 | 4/2004 | Reddy et al. ............... 166/309 |
| 6,722,434 B2 | 4/2004 | Reddy et al. ............... 166/292 |
| 6,725,935 B2 | 4/2004 | Szarka et al. |
| 6,732,797 B1 | 5/2004 | Watters et al. ............... 166/291 |
| 6,758,281 B2 | 7/2004 | Sullaway et al. |
| 6,802,374 B2 | 10/2004 | Edgar et al. |
| 6,808,024 B2 | 10/2004 | Schwendemann et al. |
| 6,810,958 B2 | 11/2004 | Szarka et al. |
| 6,920,929 B2 * | 7/2005 | Bour ............... 166/292 |
| 2002/0148614 A1 | 10/2002 | Szarka |
| 2003/0000704 A1 | 1/2003 | Reynolds |
| 2003/0029611 A1 | 2/2003 | Owens ............... 166/250.03 |
| 2003/0072208 A1 | 4/2003 | Rondeau et al. |
| 2003/0192695 A1 | 10/2003 | Dillenbeck et al. ............... 166/285 |
| 2004/0079553 A1 | 4/2004 | Livingstone |
| 2004/0084182 A1 | 5/2004 | Edgar et al. |
| 2004/0099413 A1 | 5/2004 | Arceneaux |
| 2004/0104050 A1 | 6/2004 | Järvelä et al. |
| 2004/0104052 A1 | 6/2004 | Livingstone |
| 2004/0177962 A1 | 9/2004 | Bour |
| 2004/0231846 A1 | 11/2004 | Griffith et al. |
| 2005/0061546 A1 | 3/2005 | Hannegan |
| 2006/0016599 A1 | 1/2006 | Badalamenti et al. |
| 2006/0016600 A1 | 1/2006 | Badalamenti et al. |
| 2006/0042798 A1 | 3/2006 | Badalamenti et al. |
| 2006/0086499 A1 | 4/2006 | Badalamenti et al. |
| 2006/0086502 A1 | 4/2006 | Reddy et al. |
| 2006/0086503 A1 | 4/2006 | Reddy et al. |
| 2006/0131018 A1 | 6/2006 | Rogers et al. |

FOREIGN PATENT DOCUMENTS

| | | |
|---|---|---|
| GB | 2193741 | 2/1988 |
| GB | 2327442 A | 11/1999 |
| GB | 2348828 A | 10/2000 |
| RU | 1774986 | 11/1992 |
| RU | 1778274 | 11/1992 |
| RU | 1542143 C | 12/1994 |
| RU | 2067158 | 9/1996 |
| RU | 2 086 752 C1 | 8/1997 |
| SU | 571584 | 9/1977 |
| SU | 1420139 A1 | 8/1988 |
| SU | 1534183 | 1/1990 |
| SU | 1716096 A1 | 2/1992 |
| SU | 1723309 A1 | 3/1992 |
| SU | 1758211 A1 | 8/1992 |
| WO | WO 2004/104366 | 12/2004 |
| WO | WO 2005/083299 A | 9/2005 |
| WO | WO 2006/008490 A1 | 1/2006 |
| WO | WO 2006/064184 A1 | 6/2006 |

OTHER PUBLICATIONS

Griffith, et al., "Reverse Circulation of Cement on Primary Jobs Increases Cement Column Height Across Weak Formations," Society of Petroleum Engineers, SPE 25440,315-318, Mar. 22-23, 1993.

Filippov, et al., "Expandable Tubular Solutions," Society of Petroleum Engineers, SPE 56500, Oct. 3-6, 1999.

Daigle, et al., "Expandable Tubulars: Field Examples of Application in Well Construction and Remediation," Society of Petroleum Engineers, SPE 62958, Oct. 1-4, 2000.

Fryer, "Evaluation of the Effects of Multiples in Seismic Data From the Gulf Using Vertical Seismic Profiles," SPE 25540, 1993.

Carpenter, et al., "Remediating Sustained Casing Pressure by Forming a Downhole Annular Seal With Low-Melt-Point Eutectic Metal," IADC/SPE 87198, Mar. 2-4, 2004.

Halliburton Casing Sales Manual, Section 4, Cementing Plugs, pp. 4-29 and 4-30, Oct. 6, 1993.

G.L. Cales, "The Development and Applications of Solid Expandable Tubular Technology," Paper No. 2003-136, Petroleum Society's Canadian International Petroleum Conference, Jun. 10-12, 2003.

Gonzales, et al., "Increasing Effective Fracture Gradients by Managing Wellbore Temperatures," IADC/SPE 87217, Mar. 2-4, 2004.

Griffith, "Monitoring Circulatable Hole With Real-Time Correction: Case Histories," SPE 29470, 1995.

Ravi, "Drill-Cutting Removal in a Horizontal Wellbore for Cementing," IADC/SPE 35081, 1996.

MacEachern, et al., "Advances in Tieback Cementing," IADC/SPE 79907, 2003.

Davies, et al, "Reverse Circulation of Primary Cementing Jobs—Evaluation and Case History," IADC/SPE 87197, Mar. 2-4, 2004.

Brochure, Enventure Global Technology, "Expandable-Tubular Technology," pp. 1-6, 1999.

Dupal, et al, "Solid Expandable Tubular Technology—A Year of Case Histories in the Drilling Environment," SPE/IADC 67770, Feb. 27-Mar. 1, 2001.

DeMong, et al., "Planning the Well Construction Process for the Use of Solid Expandable Casing," SPE/IADC 85303, Oct. 20-22, 2003.

Waddell, et al., "Installation of Solid Expandable Tubular Systems Through Milled Casing Windows," IADC/SPE 87208, Mar. 2-4, 2004.

DeMong, et al., "Breakthroughs Using Solid Expandable Tubulars to Construct Extended Reach Wells," IADC/SPE 87209, Mar. 2-4, 2004.

Escobar, et al., "Increasing Solid Expandable Tubular Technology Reliability in a Myriad of Downhole Environments," SPE 81094, Apr. 27-30, 2003.

Foreign Communication From a Related Counter Part Application, Oct. 12, 2005.

Foreign Communication From a Related Counter Part Application, Sep. 30, 2005.

Foreign Communication From a Related Counter Part Application, Dec. 7, 2005.

Halliburton Brochure Entitled "Bentonite (Halliburton Gel) Viscosifier", 1999.

Halliburton Brochure Entitled "Cal-Seal 60 Cement Accelerator", 1999.

Halliburton Brochure Entitled "Diacel D Lightweight Cement Additive", 1999.

Halliburton Brochure Entitled "Cementing Flex-Plug® OBM Lost-Circulation Material", 2004.

Halliburton Brochure Entitled "Cementing FlexPlug® W Lost-Circulation Material", 2004.

Halliburton Brochure Entitled "Gilsonite Lost-Circulation Additive", 1999.

Halliburton Brochure Entitled "Micro Fly Ash Cement Component", 1999.

Halliburton Brochure Entitled "Silicalite Cement Additive", 1999.

Halliburton Brochure Entitled "Spherelite Cement Additive", 1999.

Halliburton Brochure Entitled "Increased Integrity With the StrataLock Stabilization System", 1998.

R. Marquaire et al., "Primary Cementing by Reverse Circulation Solves Critical Problem in the North Hassi-Messaoud Field, Algeria", SPE 1111, Feb. 1966.

Halliburton Brochure Entitled "Perlite Cement Additive", 1999.

Halliburton Brochure Entitled "The PermSeal System Versatile, Cost-Effective Sealants for Conformance Applications", 2002.

Halliburton Brochure Entitled "POZMIX® A Cement Additive", 1999.

Foreign Communication From a Related Counter Part Application, Dec. 9, 2005.

Foreign Communication From a Related Counter Part Application, Feb. 24, 2005.

Foreign Communication From a Related Counter Part Application, Dec. 27, 2005.

Foreign Communication From a Related Counter Part Application, Feb. 23, 2006.

Foreign Communication From a Related Counter Part Application, Feb. 27, 2007.

Foreign Communication From a Related Counter Part Application, Jan. 8, 2007.

Foreign Communication From a Related Counter Part Application, Jan. 17, 2007.

* cited by examiner

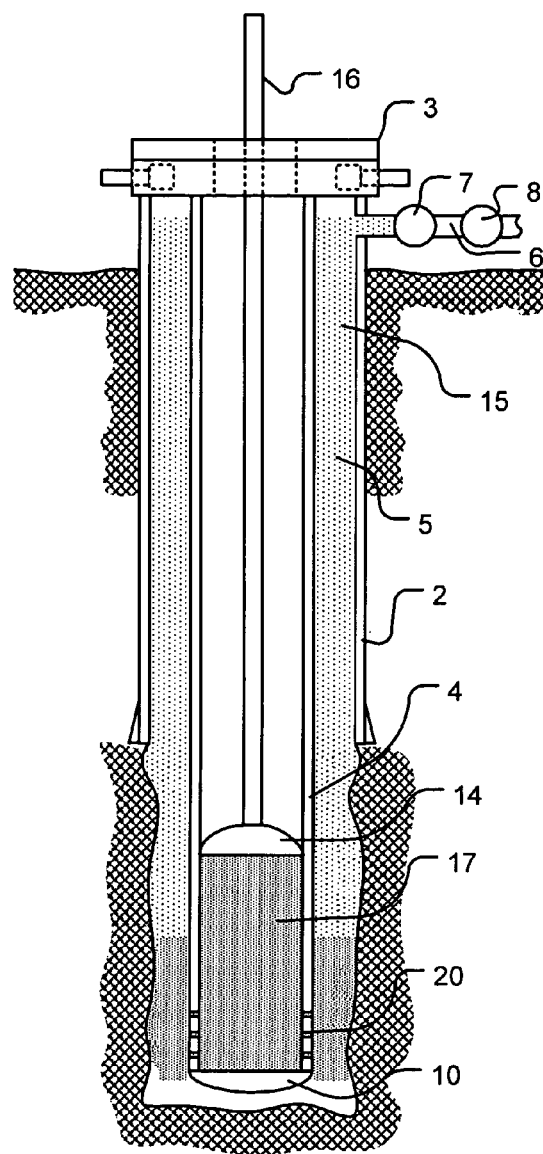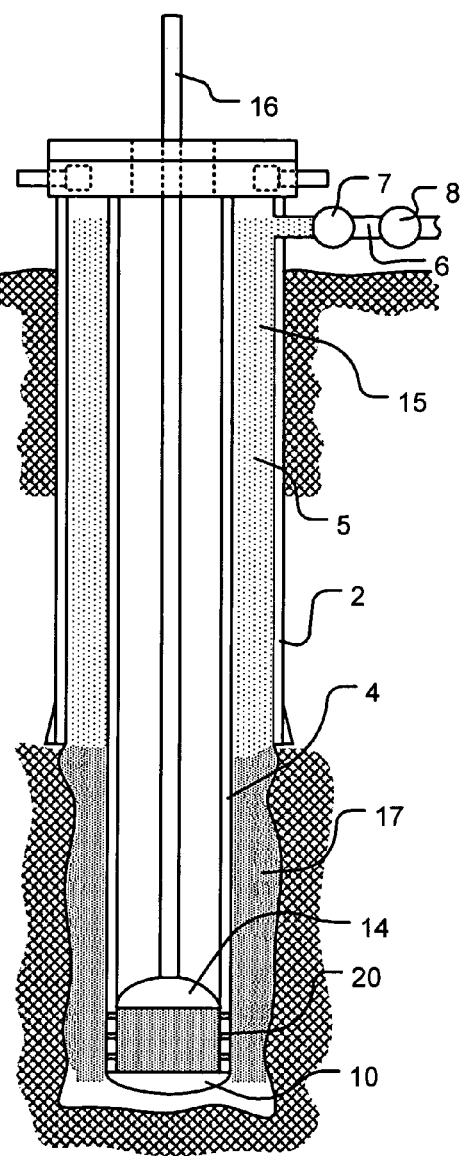
FIGURE 3C                    FIGURE 3D

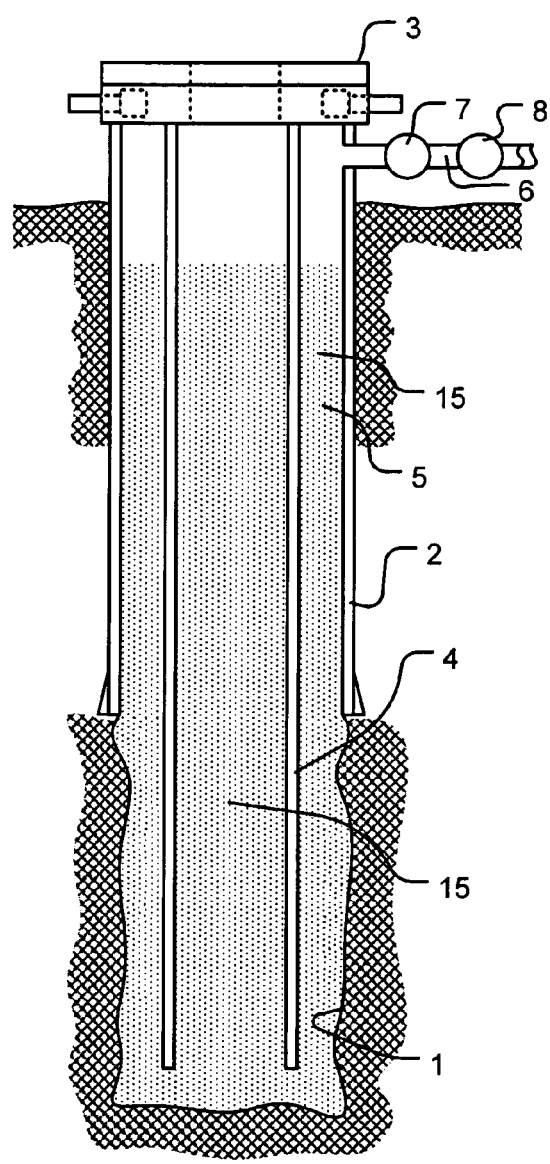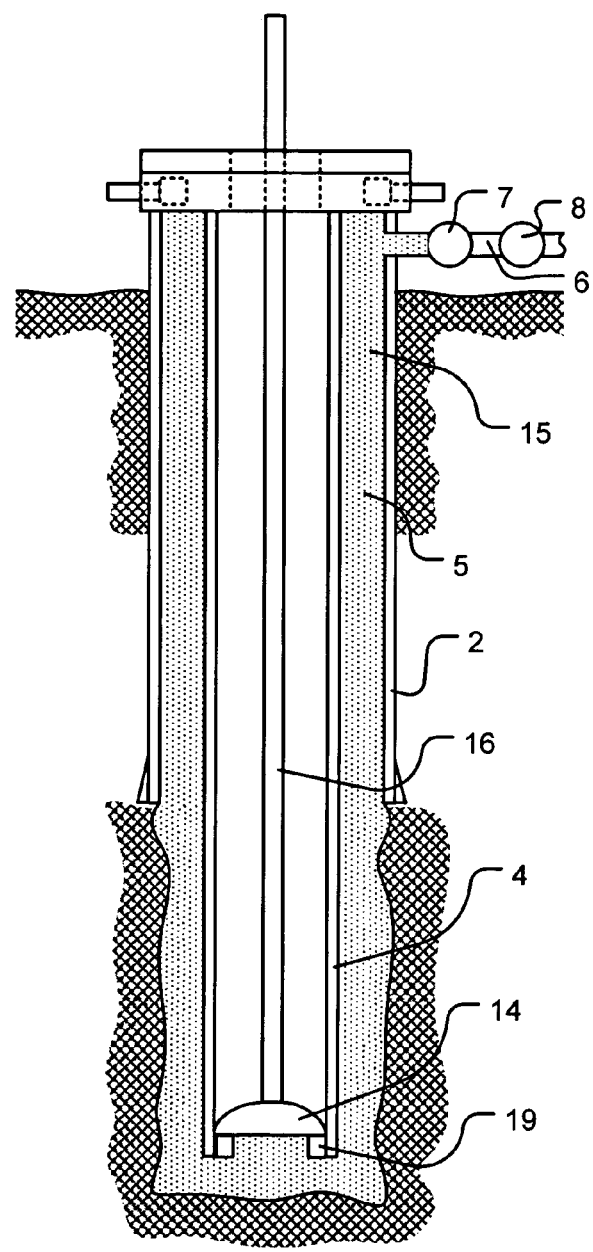
FIGURE 4C
FIGURE 4D

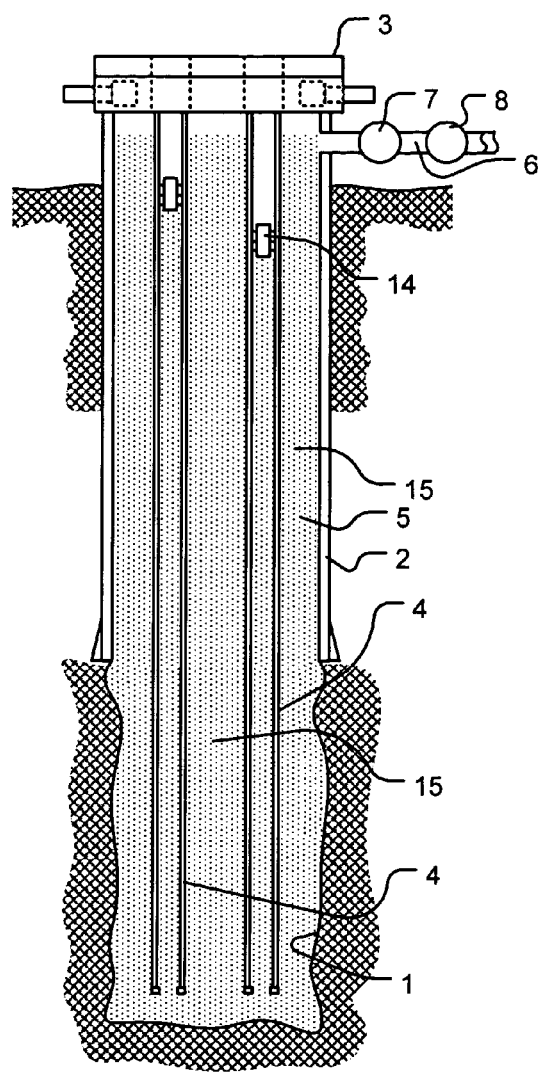
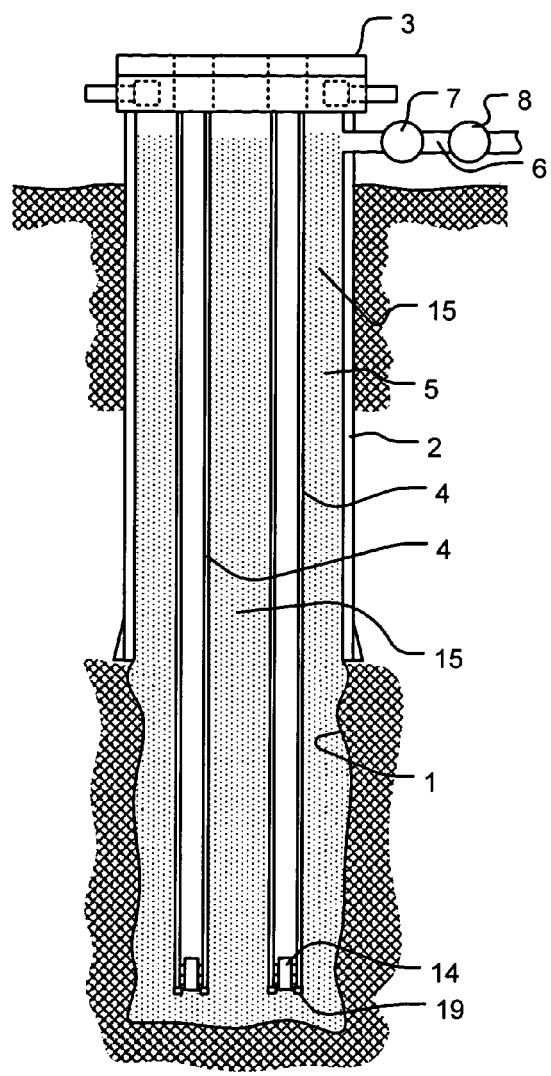
FIGURE 5C
FIGURE 5D

US 7,270,183 B2

CEMENTING METHODS USING COMPRESSIBLE CEMENT COMPOSITIONS

BACKGROUND OF THE INVENTION

This invention relates to cementing casing in a well bore. In particular, this invention relates to methods comprising reverse-circulating compressible cement compositions into single and/or multiple casing strings.

It is common in the oil and gas industry to cement casing in well bores. To do this, oftentimes a well bore is drilled and a casing string is inserted into the well bore. For reverse-circulation cementing, drilling mud and/or a circulation fluid then is circulated down through the well bore-by-casing annulus and then back up through the casing inner diameter to flush excess debris from the well. As used herein, the term "circulation fluid" includes all well bore fluids typically found in a well bore prior to cementing a casing in the well bore. After debris has been flushed from the well, a cement composition (typically comprising a hydraulic cement and a base fluid) may be placed into the well bore-by-casing annulus, and permitted to set therein.

Conventional methods of placing the cement composition in the annulus commonly involve pumping a cement composition slurry down the casing inner diameter, out through a casing shoe and/or circulation valve at the bottom of the casing, and up through the annulus to its desired location. Such methods often are referred to as conventional-circulation direction methods. Though conventional-circulation direction methods are the methods most commonly used for pumping cement compositions into well bores, these methods may be problematic in certain circumstances. For instance, a well bore may comprise one or more weak formations therein that may be unable to withstand the pressure commonly associated with conventional-circulation direction cementing operations. In these, and other circumstances, a second method of cementing may be employed wherein a cement composition slurry is pumped directly down the annulus, and permitted to set therein. This method often is referred to as a reverse-circulation direction method. When the cement composition slurry is reverse-circulated into the annulus, it displaces well fluids present in the annulus (e.g., the drilling mud and/or the circulation fluid) by pushing them through the casing shoe and up into the casing inner diameter. Reverse circulating the cement composition into the annulus may be useful in a variety of circumstances. For example, when the well bore comprises one or more weak formations, reverse-circulation cementing can reduce the pressure exerted against these weak formations during placement. A reduction in pressure can help prevent loss of whole cement fluid to the formation, which if it occurs can result in incomplete annular fill of the annulus with cement, need for extra cement being used, and/or require remedial operations to fill the annulus. The reduction in pressure by the reverse-circulation method is typically achieved by reducing the total pressure exerted on formations by the fluid being circulated out of the hole. Conventional-circulation cementing requires lifting a typically higher density cement up the annulus, with a total pressure exerted on the formations equal to the fluid density above them plus the friction pressure that occurs by circulating the cement up a typically narrow annulus. The total pressure exerted on the formation during reverse circulation is the fluid in the casing, which is typically a lower density well drilling fluid or other lighter weight fluid, plus the friction of pumping this fluid up a typically large diameter casing. The net reduction in total pressure exerted on the formation for reverse-circulation in comparison to conventional circulation can be significant and have a significant impact on reducing the potential for lost circulation, and the associated problems, from occurring.

Conventional reverse-circulation cementing operations may be problematic, however, for a variety of reasons. For example, it may be difficult to determine when the reverse-circulated cement composition has traveled through the entirety of the annulus and arrived at the casing shoe and/or circulation valve. Conventional attempts to solve this problem commonly have involved, e.g., disposing wireline tools within the casing string and including radioactive tracers in the cement composition to be reverse-circulated. For example, a wireline tool may be disposed within the well bore to sense the arrival at the casing shoe of the radioactive tracers within the cement composition.

Other conventional attempts to identify the arrival at the casing shoe and/or circulation valve of the reverse-circulated cement composition have involved, e.g., determining the annular volume to be filled with cement composition, and closely monitoring the volume of the cement composition reverse circulated into the annulus, to ensure that excessive cement composition is not pumped into the annulus. However, it may be difficult to accurately determine the actual volume of the annulus, which creates a risk of either a cement shortfall (e.g., pumping a volume of cement composition that is inadequate to fill the entirety of the annulus), or an excess of cement composition beyond that required to fill the annulus, which may result in the overflow of excess cement composition into the inner diameter of the casing string. Such inadvertent overflow of cement composition from the annulus into the inner diameter of the casing string generally is undesirable, because, upon the setting of such cement composition, the hardened cement typically must be drilled out of the casing string before further operations can be conducted in the well bore and/or the well can be put into service. Drilling out the set cement within the casing string requires extra labor and additional (often costly) rig time.

Furthermore, even when the annular volume is accurately measured, and the proper amount of cement composition is reverse-circulated, a portion of the cement composition still may inadvertently overflow into the inner diameter of the casing string. This phenomenon may be referred to in the art as "U-tubing." The risk of a portion of the reverse-circulated cement composition inadvertently U-tubing into the inner diameter of the casing string may be exacerbated by the fact that the equipment commonly used to prevent U-tubing (e.g., float collars) may not be feasible for use in reverse-circulation operations. Accordingly, conventional attempts to prevent U-tubing during reverse-circulation operations commonly have involved pressurizing the casing string inner diameter to prevent, or impair, the entry therein of the reverse-circulated cement composition. However, these methods have been problematic because they undesirably may create a micro-annulus between the casing string and the set cement sheath that is formed by the setting of the reverse-circulated cement composition in the annulus. This micro-annulus may be undesirable because it may complicate bond-logging efforts (operations which evaluate the quality of the cement job and determine whether the annulus has been sealed properly) and/or allow for a flow path of fluids and/or gases in the annulus which one is attempting to seal with the cement.

SUMMARY OF THE INVENTION

This invention relates to cementing casing in a well bore. In particular, this invention relates to methods comprising reverse-circulating compressible cement compositions into casing.

One aspect of the invention provides a method of cementing casing in a well bore, the method having the following steps: flowing a first cement composition into an annulus defined between the casing and the well bore, the first cement composition comprising a compressible cement composition; flowing a second cement composition into the inner diameter of the casing; pumping the second cement composition from the inner diameter of the casing into the annulus, wherein the first cement composition is compressed by the pumping; and permitting the first and second cement compositions to set within the annulus.

According to another aspect of the invention, there is provided a method of cementing at least two casing strings in a well bore, the method having steps as follows: filling the well bore and the inner diameters of the at least two casing strings with a cement composition, wherein at least a portion of the cement composition is a compressible cement composition; pumping the cement composition from the inner diameters of the at least two casing strings into the annulus, wherein the compressible portion of the cement composition is compressed by the pumping; and permitting the cement composition to set within the annulus.

A further aspect of the invention provides a method of cementing casing in a well bore, the method having steps including: flowing a first cement composition into an annulus defined between the casing and the well bore, the first cement composition comprising a variable-density cement composition; flowing a second cement composition into the inner diameter of the casing; pumping the second cement composition from the inner diameter of the casing into the annulus, wherein the first cement composition is reduced in volume by the pumping; and permitting the first and second cement compositions to set in the annulus.

According to a still further aspect of the invention, there is provided a method for cementing casing in a well bore, the method employing the steps as follows: flowing a compressible cement composition into the well bore; running the casing into the well bore so as to allow at least a portion of the compressible cement composition in the well bore to enter the casing; pushing at least a portion of the compressible cement composition inside the casing into the annulus; and permitting the at least a portion of the compressible cement composition to set in the annulus.

A further aspect of the invention provides a method of cementing casing in a well bore, the method having: flowing a first cement composition into an annulus defined between a plurality of casing strings and the well bore, the first cement composition comprising a compressible cement composition; flowing a second cement composition into the inner diameters of the plurality of casing strings; and pumping the second cement composition from the inner diameters of the plurality of casing strings into the annulus, wherein the pumping comprises pushing a plurality of wiper plugs through the plurality of casing strings, wherein the first cement composition is compressed by the pumping.

Still another aspect of the invention provides a system for cementing casing in a well bore, the system having elements as follows: a casing for being positioned in a well bore, wherein the casing has at least one opening in an end of the casing; a compressible cement composition that is flowable from inside the casing through the at least one opening in the end of the casing; and a wiper plug positioned within the casing, wherein the wiper plug pushes the compressible cement composition through the at least one opening in the end of the casing.

The objects, features, and advantages of the present invention will be readily apparent to those skilled in the art upon a reading of the description of the preferred embodiments which follows.

BRIEF DESCRIPTION OF THE FIGURES

The present invention may be better understood by reading the following description of non-limitative embodiments with reference to the attached drawings wherein like parts of each of several figures are identified by the same referenced characters, and which are briefly described as follows.

FIG. 3C is a cross-sectional, side view of the well bore of FIGS. 3A and 3B, wherein a wiper plug is inserted into the inner diameter of the casing.

FIG. 3D is a cross-sectional, side view of the well bore of FIGS. 3A-3C, wherein the wiper plug has pushed the cement composition from the inner diameter of the casing into the annulus.

FIG. 4C is a cross-sectional, side view of the well bore of FIGS. 4A and 4B.

FIG. 4D is a cross-sectional, side view of the well bore of FIGS. 4A-4C.

FIG. 5C is a cross-sectional, side view of the well bore of FIGS. 5A and 5B.

FIG. 5D is a cross-sectional, side view of the well bore of FIGS. 5A-5C.

Figure 1:
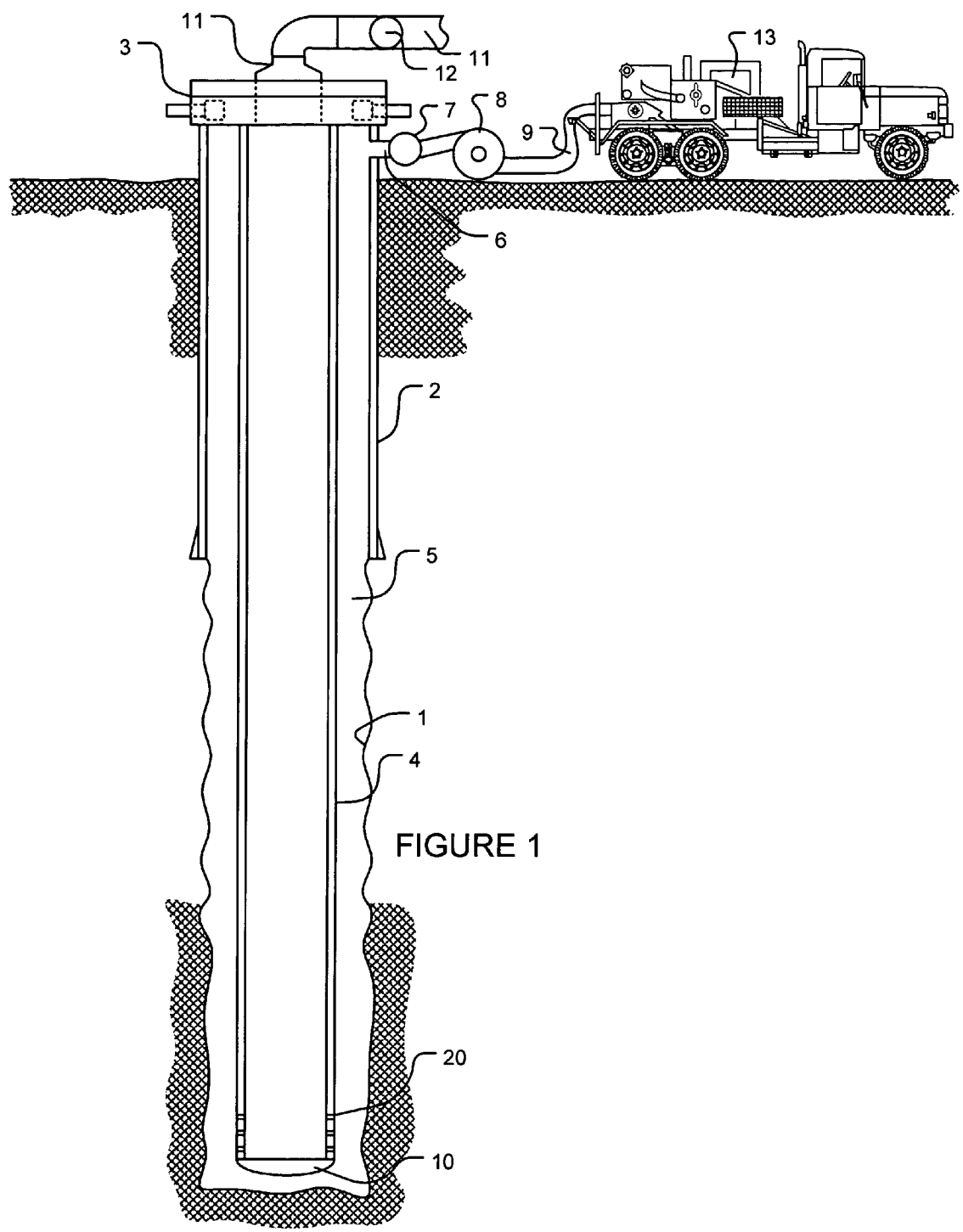
FIG. 1 is a cross-sectional, side view of a well bore with a well head mounted on a surface casing and casing suspended from the well head.

It is to be noted, however, that the appended drawings illustrate only typical embodiments of this invention and are therefore not to be considered limiting of its scope, as the invention may admit to other equally effective embodiments.

DETAILED DESCRIPTION OF THE INVENTION

The present invention relates to cementing casing in a well bore. In particular, the present invention relates to methods comprising reverse-circulating compressible cement compositions into casing. Certain embodiments of the methods of the present invention may reduce the pressure to which a subterranean formation may be exposed while casing is cemented therein. Certain embodiments of the methods of the present invention may reduce, or eliminate, the risk of having a cement composition left in the inner diameter of a casing string at the completion of a cementing operation. Certain embodiments of the methods of the present invention may result in a set cement sheath that may be bond logged more easily with greater accuracy.

The methods of the present invention generally comprise placing a compressible cement composition into a subterranean formation. In certain embodiments of the present invention, the compressible cement composition may be reverse-circulated into place in an annulus in the formation, and ultimately may be permitted to set therein. In one embodiment of the methods of the present invention, a compressible cement composition may be reverse-circulated down the annulus, back up inside the casing, and all the way back to the surface, whereupon a wiper plug then may be displaced to the bottom of the casing string, thereby displacing the compressible cement composition back into the annulus. Due at least in part to the compressible nature of the compressible cement composition, such operation may result in only a slight increase in pressure within the annulus. In certain embodiments of the present invention, a wiper plug may be used that may be latched or secured to a lowermost portion of the casing string, or into an assembly near the bottom of the well, upon the arrival of the wiper plug at such location; latching or securing the wiper plug in such fashion may provide a positive indication at the surface that cement has been totally displaced from the tubing (when the plug "lands" no more fluid can be pumped and the tubing pressure will rise) and impose a physical barrier that may prevent or impair backflowing or U-tubing of the compressible cement composition from the annulus into the inner diameter of the casing string.

The methods of the present invention may be used with all manner of casing sizes. Certain embodiments of the methods of the present invention may be particularly useful with relatively smaller casing sizes. Relatively smaller casing sizes may be employed in a variety of operations, including, inter alia, steam injection wells, where multiple casing strings may be used to inject steam at different depths within the well. In certain embodiments of the methods of the present invention wherein relatively smaller casing sizes are used, the quantity of compressible cement composition to be re-compressed back down the casing and into the annulus may be minimized. In certain embodiments of the methods of the present invention wherein casing is used that has an inner diameter of less than about 5 to 3 inches, an operator may elect to employ a plurality of casing strings, rather than a single casing string.

In making such election, the operator may note that when reverse circulation cementing operations are conducted with casing strings having inner diameters of less than about 3 inches, the use of increasingly smaller inner diameters may increase the friction caused by circulating fluids up the tubing so as to increase the Equivalent Circulation Density ("ECD") in the open hole annulus, making the ECD equal to or greater than that which could be obtained by circulating the fluids in a conventional direction. By employing a plurality of casing strings, rather than a single casing string having a relatively small inner diameter, the effective flow area desirably may be increased. For example, where one 2⅜ inch tubing string has an inner diameter of 1.995 inches, the flow area of two strings of 2⅜ inch tubing reduces the rate of flow by half and significantly may impact the friction pressure. Accordingly, flowing concurrently through two 2⅜ inch tubing strings greatly may reduce the pressure drop that otherwise may be experienced when pumping through only a single 2⅜ inch tubing string. In this example, the friction pressure for pumping water a distance of 1,600 feet is as follows:

A flow rate of 3 barrels per minute through 1 string of 2⅜" tubing produces 240 psi of friction pressure;

A flow rate of 1.5 barrels per minute through each of 2 strings of 2⅜" tubing produces 65 psi of friction pressure.

By employing a plurality of relatively smaller casing strings in certain embodiments of the present invention, the ECD in the annulus during placement significantly may be reduced. The optional election to employ a plurality of relatively smaller casing strings in certain embodiments of the present invention may be applicable for pumping both compressible cement compositions and relatively incompressible cement compositions.

I. Some Embodiments of the Methods of the Present Invention

Referring now to FIG. 1, a cross-sectional side view of a well bore is illustrated therein. Surface casing 2 is installed in the well bore 1. Well head 3 is attached to the top of surface casing 2, and casing 4 is suspended from well head 2 and well bore 1. Annulus 5 is defined between well bore 1 and casing 4. Casing shoe 10 is attached to the bottom most portion of casing 4. Feed line 6 is connected to surface casing 2 to fluidly communicate with annulus 5. Feed line 6 has a feed valve 7 and a feed pump 8. Pump truck line 9 connects the feed pump to cement pump truck 13. Alternatively, feed line 6 may be connected directly to cement pump truck 13. Feed line 6 also may be connected to a vacuum truck, a stand alone pump or any other pumping mechanism known to persons of skill. Return line 11 is connected to well head 3 so as to fluidly communicate with the inner diameter of casing 4. The return line includes return valve 12. Casing 4 also comprises circulation valve 20 near casing shoe 10. When circulation valve 20 is open, circulation fluid may flow between annulus 5 and the inner diameter of casing 4 through circulation valve 20.

Figure 2A:
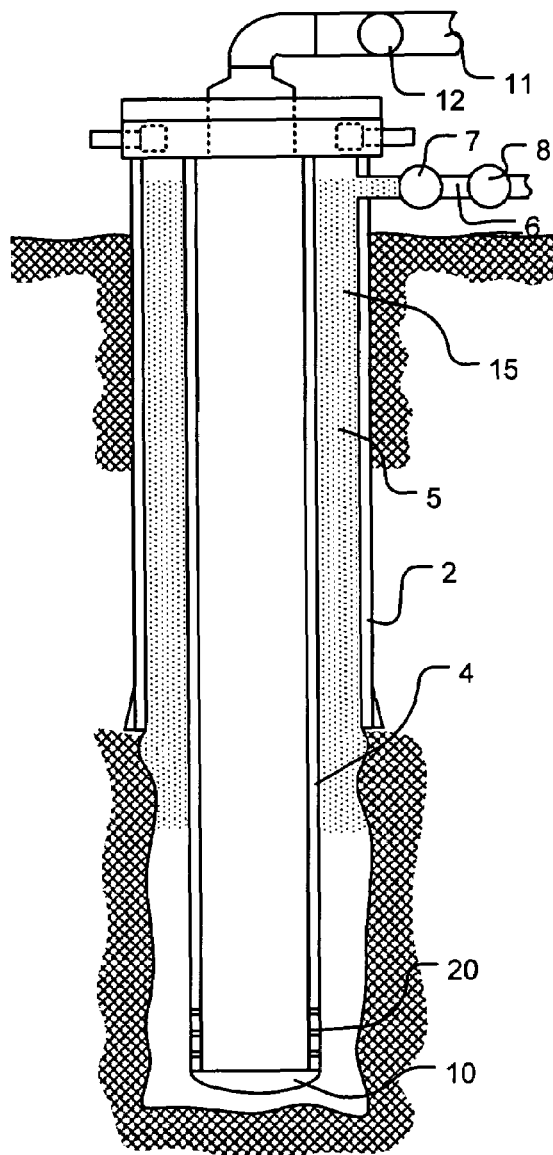
FIG. 2A is a cross-sectional, side view of the well bore of FIG. 1, wherein a cement composition is being flowed down the annulus.
Figure 2B:
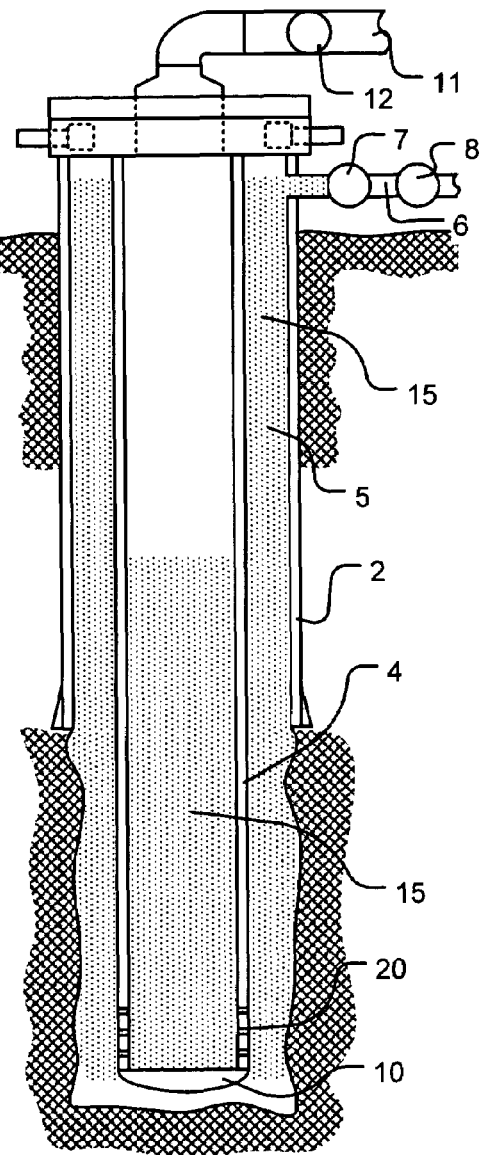
FIG. 2B is a cross-sectional, side view of the well bore of FIG. 2A, wherein the cement composition has filled the annulus and is flowing up the casing inner diameter.
Figure 2C:
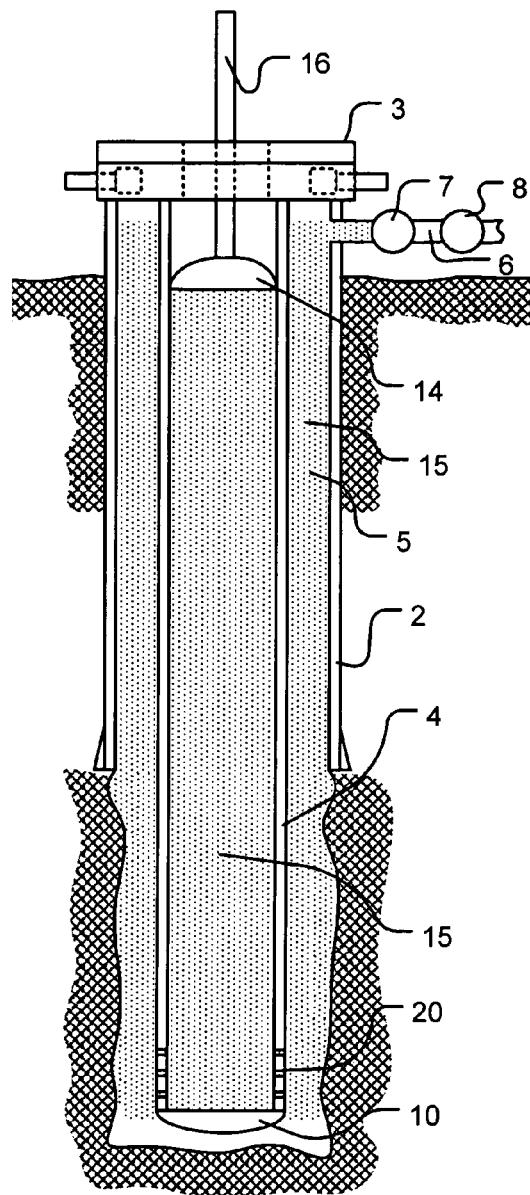
FIG. 2C is a cross-sectional, side view of the well bore of FIGS. 2A and 2B, wherein the cement composition has filled the annulus and the casing inner diameter and a wiper plug is inserted into the casing inner diameter.
Figure 2D:
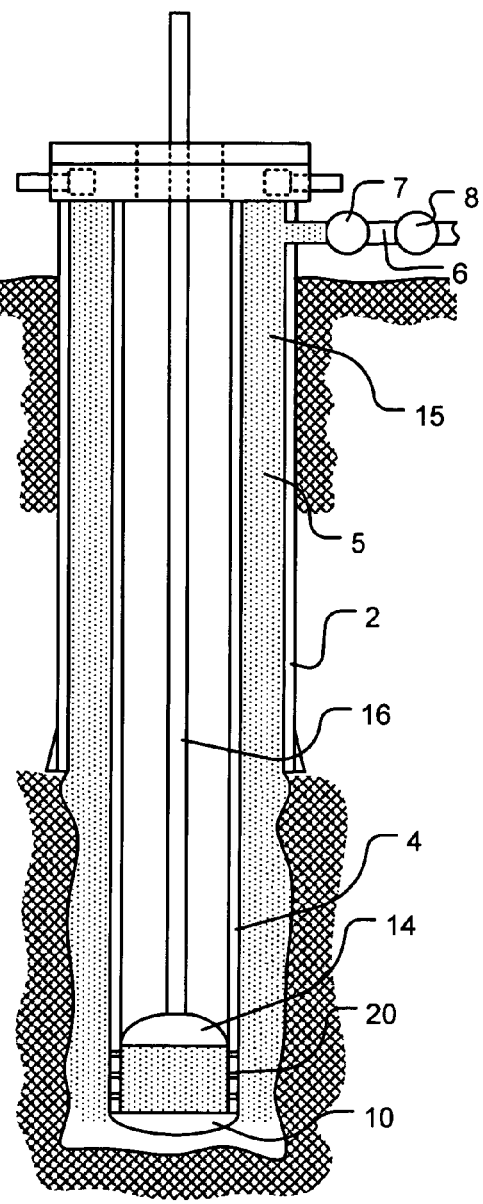
FIG. 2D is a cross-sectional, side view of the well bore of FIGS. 2A-2C, wherein the wiper plug has pushed the cement composition from the inner diameter of the FIG. 3A is a cross-sectional, side view of the well bore of FIG. 1, wherein a cement composition and a compressible cement composition are being flowed down the annulus.

FIGS. 2A-2D illustrate cross-sectional, side views of the well bore shown in FIG. 1, wherein an embodiment of the invention is described with reference thereto. According to this embodiment of the invention, a compressible cement composition is pumped in a reverse-circulation direction to completely fill annulus 5 and the inner diameter of casing 4, and then the compressible cement composition is pushed back out into annulus 5. In FIG. 2A, a compressible cement composition 15 is shown being pumped down annulus 5 in a reverse-circulation direction. FIG. 2B shows compressible cement composition 15 having completely filled annulus 5, passed through circulation valve 20 and partially filling the inner diameter of casing 4. In FIG. 2C, compressible cement composition 15 has completely filled the inner diameter of casing 4, and wiper plug 14 has been inserted on work string 16 into the inner diameter of casing 4 through the well head 3. Wiper plug 14 may be of any kind presently known (or that may become known in the future) to persons of skill. As shown in FIG. 2D, wiper plug 14 is pushed down the inner diameter of casing 4 to thereby displace compressible cement composition 15 back through casing circulation valve 20 and into annulus 5.

Excess compressible cement composition 15, if any, may be removed from annulus 5 through feed line 6. The overflow of fluids out of the well bore may be halted once uncontaminated cement is observed at the surface. Such excess compressible cement composition 15 as may overflow out of the well bore may be flowed into a pit or other container for subsequent re-use or disposal. When wiper plug 14 displaces compressible cement composition 15 from the inner diameter of casing 4 into annulus 5, the compressible nature of compressible cement composition 15 may result in pressure increase in the wellbore and may or may not be accompanied by the circulation of cement composition out of the well bore.

In one embodiment of the present invention, a latching mechanism (not shown) may be used that may facilitate latching or securing wiper plug 14 within casing 4 at circulation valve 20. A broad variety of latching mechanisms are known to those of ordinary skill in the art, and may be used in accordance with the present invention. In certain embodiments of the present invention, the latching mechanism may comprise any self-energized device designed so as to engage and latch with a matching latch-down receiving configuration that may be disposed at a lowermost end of casing 4, or at the bottom of the well. For example, certain embodiments of wiper plug 14 may comprise a nose portion that further may comprise a groove on an outer diameter thereof; when such embodiments of wiper plug 14 are used, an example of a suitable latching mechanism may comprise a self-energized "C" ring profile that may be attached to such embodiments of wiper plug 14 by expanding the "C" ring profile over the major outer diameter of the nose portion, so as to lodge in the groove. In such embodiments, a matching latch-down receiving configuration may be disposed at a lowermost end of casing 4, or at the bottom of the well. Latching or securing wiper plug 14 may impose a physical barrier between the inner diameter of casing string 4 and cement composition 15 that has been displaced into the annulus, thereby preventing cement composition 15 from "U-tubing" or backflowing into the inner diameter of casing 4. Accordingly, the use of a "latchable" wiper plug or some other similar device may reduce, or eliminate, any need to maintain pressure on the inner diameter of casing 4 to prevent U-tubing of cement composition 15. Because wiper plug 14 is fixed in casing shoe 10 during solidification of cement composition 15, work string 16 may be released from wiper plug 14 and withdrawn from casing 4 at a desired time.

In a further embodiment of the invention, wiper plug 14 may be pushed down the inner diameter of casing 4 by pumping some displacement fluid and pressurizing the inner diameter of casing 4 behind wiper plug 14.

In the illustrated embodiment of the invention, compressible cement composition 15 is pumped in a reverse-circulation direction to completely fill annulus 5 and the inner diameter of casing 4, and then compressible cement composition 15 is pushed back out into annulus 5.

Figures 3A, 3B:
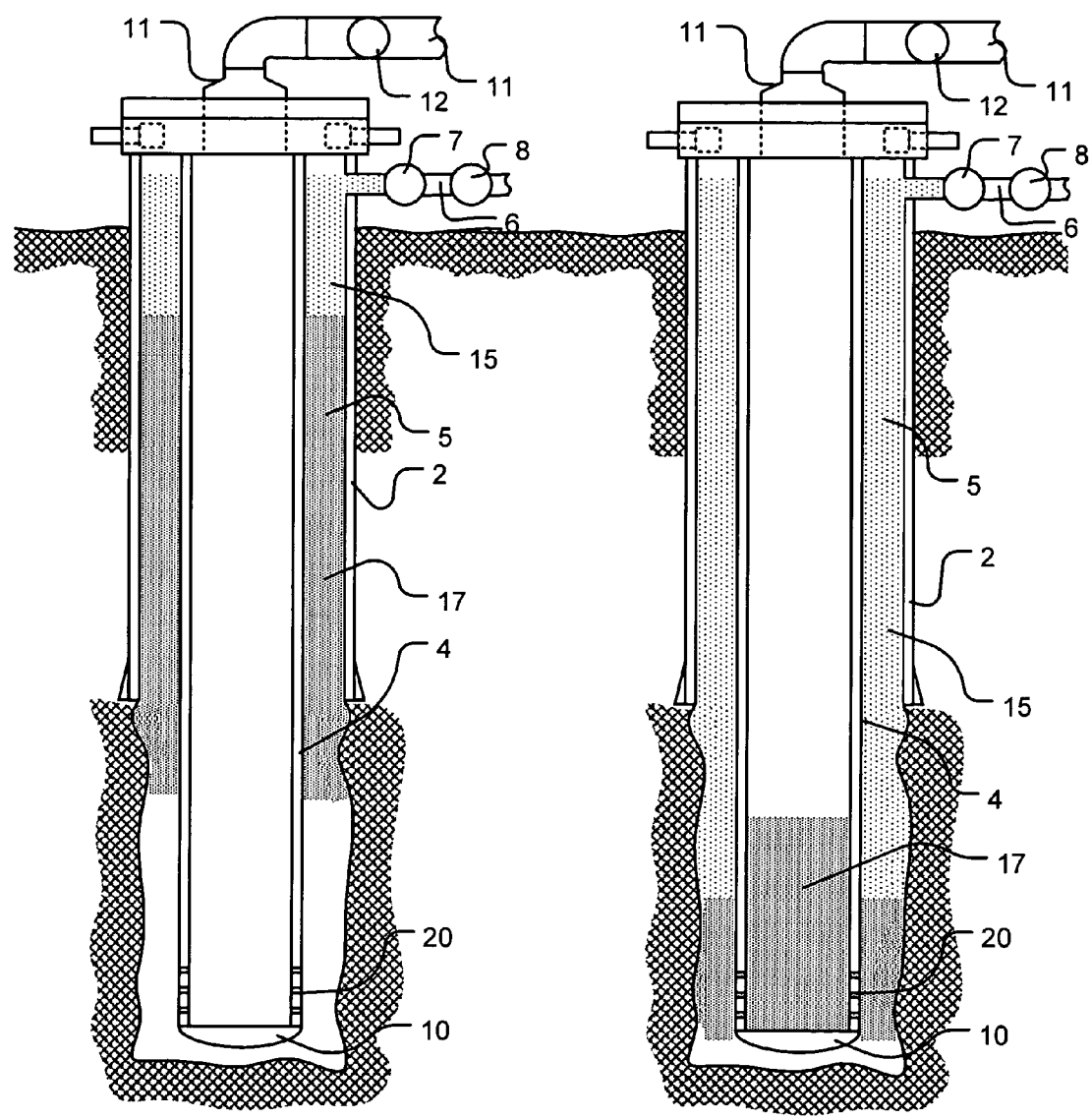
FIG. 3B is a cross-sectional, side view of the well bore of FIG. 3A, wherein a portion of the cement composition has flowed into the inner diameter of the casing and the compressible cement composition has filled the remaining portion of the annulus.

FIGS. 3A-3D illustrate cross-sectional, side views of the well bore shown in FIG. 1 wherein an embodiment of the present invention is described with reference thereto. According to this embodiment of the present invention, incompressible cement composition 17 is pumped in a reverse-circulation direction ahead of compressible cement composition 15 until incompressible cement composition 17 has passed through casing shoe 10. Wiper plug 14 then is used to displace excess incompressible cement composition 17 back into annulus 5. In FIG. 3A, incompressible cement composition 17 is shown being pumped down the annulus 5 in a reverse-circulation direction ahead of compressible cement composition 15. This process is continued until, as shown in FIG. 3B, at least a portion of incompressible cement composition 17 has passed from annulus 5, through circulation valve 20 and into the inner diameter of casing 4. When the operator is assured that at least a portion of incompressible cement composition 17 has been pumped into the inner diameter of casing 4, wiper plug 14 (disposed on work string 16) is inserted into casing 4 through well head 3, as illustrated in FIG. 3C. Wiper plug 14 then is used to displace excess incompressible cement composition 17 from the inner diameter of casing 4 into annulus 5 in a conventional-circulation direction. Compressible cement composition 15 in the upper portion of annulus 5 thereby may compressed somewhat, to thereby reduce its volume. Any excess compressible cement composition 15 that may exist may be removed from annulus 5 through feed line 6. This embodiment of the present invention may increase the Equivalent Circulating Densities (ECD) at the end of a cementing job to a slight extent. This embodiment of the present invention may result in the placement of a higher-strength, non-foamed cement composition at the shoe of the casing string.

Figure 4A:
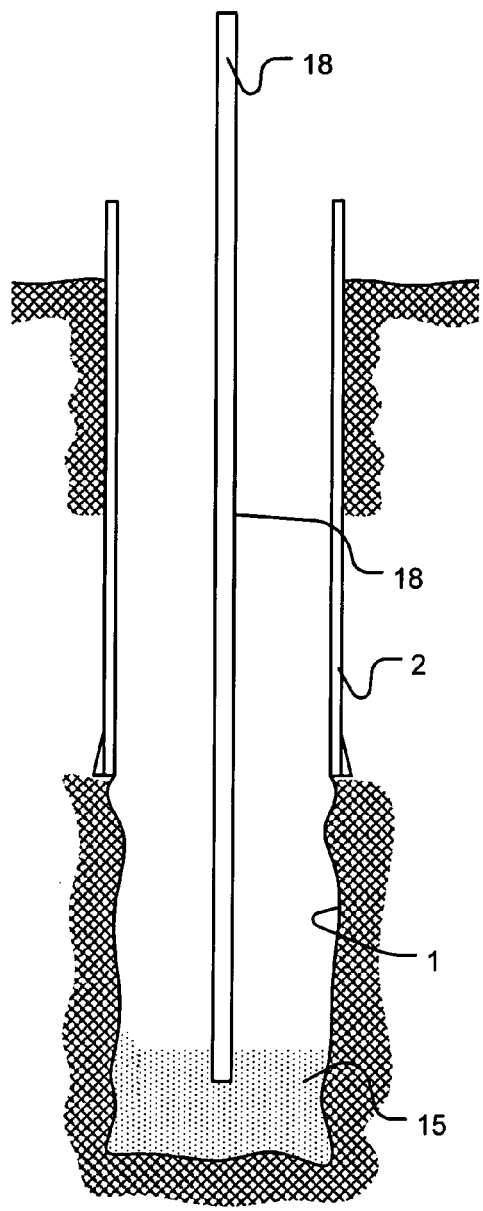
FIG. 4A is a cross-sectional, side view of the well bore of FIG. 1.
Figure 4B:
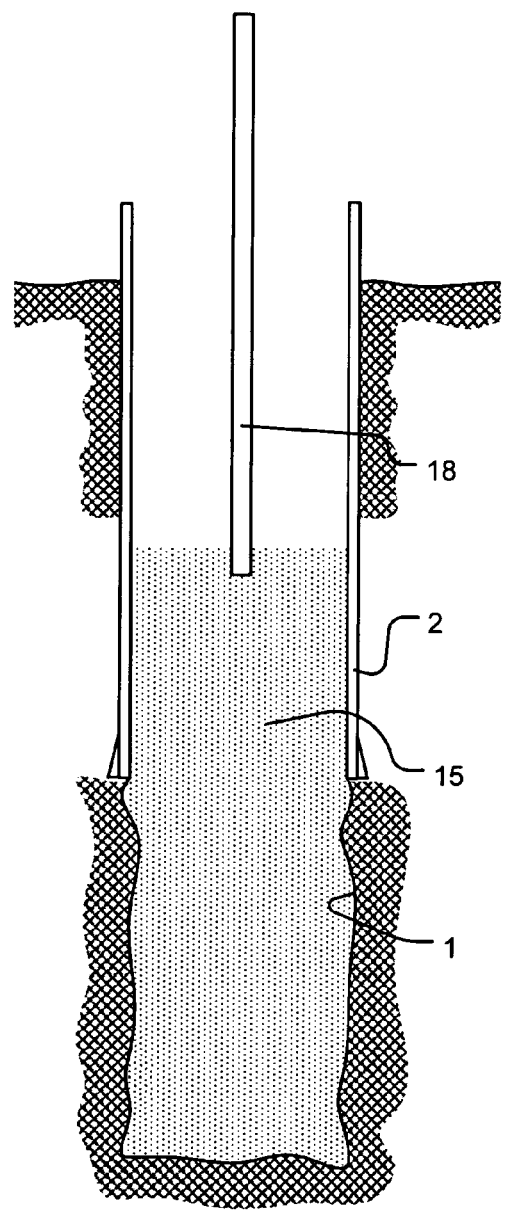
FIG. 4B is a cross-sectional, side view of the well bore of FIG. 4A.

Referring to FIGS. 4A-4D, others methods of the invention are illustrated therein. FIG. 4A shows a cross-sectional, side view of well bore 1 having surface casing 2 installed therein. Well bore 1 is filled with compressible cement composition 15 before a casing is run into well bore 1. If well bore 1 is dry, compressible cement composition 15 simply may be flowed into open well bore 1; if well bore 1 contains fluids, tubing 18 may be injected into well bore 1 for pumping compressible cement composition 15 down the inner diameter of tubing 18. As compressible cement composition 15 is pumped into well bore 1 from the bottom up, tubing 18 may be withdrawn from well bore 1, as shown in FIG. 4B. Because tubing 18 may be withdrawn from well bore 1 as compressible cement composition 15 is being pumped, relatively low fluid pressures may be exerted on the subterranean formation. Well bore 1 is completely filled to a mouth thereof, or may be filled with an amount of compressible cement composition calculated to exceed the volume of annulus 5. Next, as is shown in FIG. 4C, casing 4 is run into well bore 1, and well head 3 is attached to surface casing 2. The bottom end of casing 4 is open to allow free entry of compressible cement composition 15 into casing 4 as casing 4 is run into well bore 1. After casing 4 is positioned in well bore 1, wiper plug 14 on work string 16 is run down the inner diameter of casing 4 to push compressible cement composition 15 inside casing 4 into annulus 5, as illustrated in FIG. 4D. As previously described, wiper plug 14 may be latched in the bottom of casing 4 and work string 16 may be withdrawn. Also, wiper plug 14 may be pumped with pressure to the bottom of casing 4. Wiper plug 14 may be locked in casing 4 near the opening at the bottom of casing 4 by lock or latch 19.

Figure 5A:
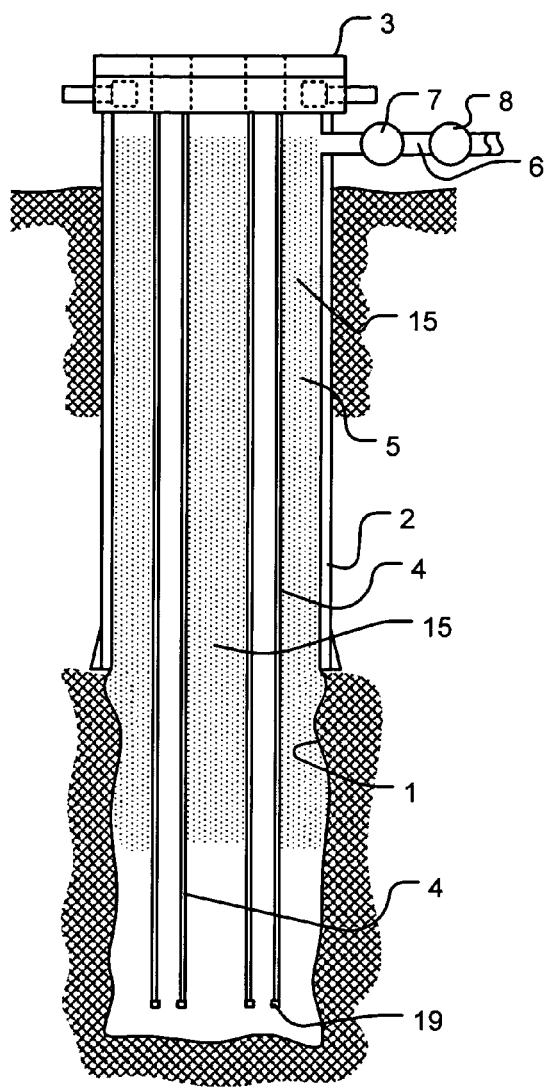
FIG. 5A is a cross-sectional, side view of the well bore of FIG. 1.
Figure 5B:
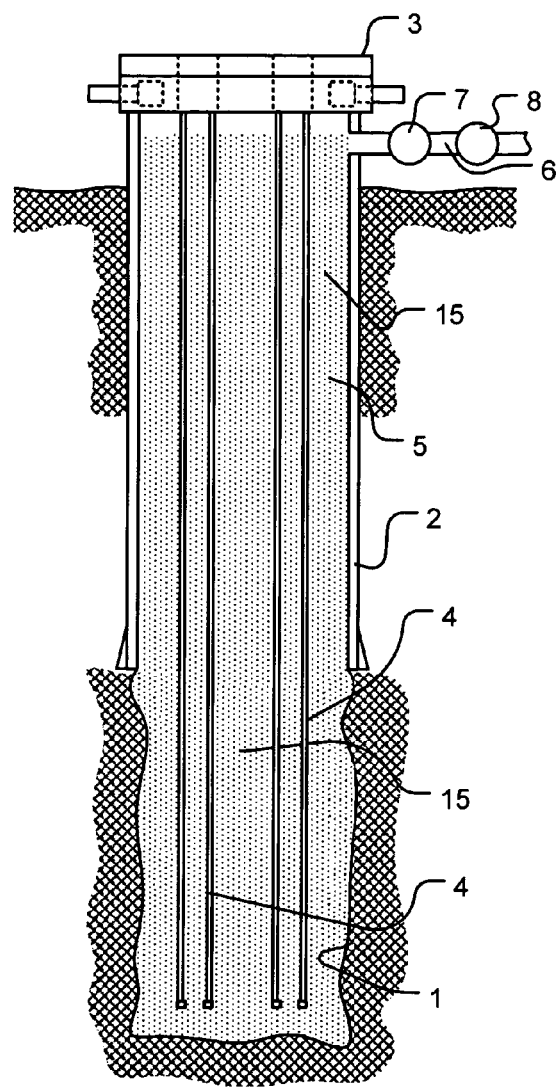
FIG. 5B is a cross-sectional, side view of the well bore of FIG. 5A.

As illustrated in FIGS. 5A-5D, certain embodiments of the invention may be used to cement multiple casing strings at the same time in single well bore. FIG. 5A shows a cross-sectional, side view of well bore 1 having surface casing 2 installed therein. Two casing strings 4 are suspended in the well bore 1 from the well head 3. A compressible cement composition 15 is reverse circulated in the well bore 1 so as to fill the space between the well bore 1 and the casing strings 4. In some embodiments, the well bore 1 may be filled with a compressible cement composition before the multiple casing strings 4 are run into the well bore. FIG. 5B illustrates the well bore of FIG. 5A wherein the compressible cement composition 15 has flowed in the reverse circulation direction all the way to the bottom of the well bore 1 and back up the inner diameters of the casing strings 4 so that the casing strings 4 are completely filled. Because the compressible cement composition may be mixed or made up as it is injected down the well bore, the operator need only mix the required amount and no more. When the operator observes the that the compressible cement composition has reached the tops of the casing strings 4, he may cease mixing or making up additional cement composition. In FIG. 5C, separate wiper plugs 14 are inserted into each of the inner diameters of casing strings 4 to push the compressible cement composition 15 out the bottoms of the casing strings 4. The wiper plugs 14 may be pumped down the casing strings 4 with fluid pressure or with a tubing string, or by any means known to persons of skill. As illustrated in FIG. 5D, the wiper plugs 14 may be pumped all the way to the bottoms of the casing strings 4 and latched in locks or latches 19 located in the bottoms of the casing strings 4. Because a compressible cement composition may be used in these embodiments of the invention, little or no cement composition need be taken back out of the well bore at the surface as the wiper plugs are pumped down the casing strings. Rather, the compressible cement composition compresses in the well bore. After the compressible cement composition has solidified in the well bore 1, the casing strings 4 may be perforated at various depths to conduct desired operations.

In alternative embodiments of the invention, any cement composition may be used in place of the incompressible cement noted above. In particular, any cement composition may be flowed into the well bore for placement in the annulus near the casing shoe, including those cement compositions that do not vary in density as a function of pressure.

II. Compressible Cement Compositions Useful with the Present Invention

The compressible cement compositions used with the present invention may reduce the pressure exerted on the formation by the cement operations disclosed herein, because, inter alia, the compressible cement compositions may have a significantly lower density than that of conventional cement compositions. As the compressible cement compositions are circulated upwards into the casing string, the static fluid pressure may decrease, and the density of the foamed cement compositions also may decrease.

Any compressible cement composition known to persons of skill may be used with the present invention. Certain embodiments of the compressible cement compositions used with the present invention may be foamed cement compositions.

In certain embodiments of the present invention wherein a foamed cement composition is used, such foamed cement composition may comprise a gas-generating additive. The gas-generating additive may generate a gas in situ at a desired time. The inclusion of the gas-generating additive in the compressible cement compositions useful with the present invention may assist in mitigating annulus pressure buildup, through compression of the gas generated by the gas-generating additive. Nonlimiting examples of suitable gas-generating additives include aluminum powder (which may generate hydrogen gas) and azodicarbonamide (which may generate nitrogen gas). The reaction by which aluminum generates hydrogen gas in a cement composition is influenced by, inter alia, the alkalinity of the cement composition, and generally proceeds according to the following reaction:

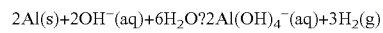

$$2Al(s)+2OH^-(aq)+6H_2O?2Al(OH)_4^-(aq)+3H_2(g)$$

Where present, a gas-generating additive may be included in the compressible cement compositions used in the present invention in an amount in the range of from about 0.2% to about 5% by volume of the compressible cement composition. In certain embodiments, the gas-generating additive may be included in the compressible cement compositions used in the present invention in an amount in the range of from about 0.25% to about 3.8% by volume of the compressible cement composition. The gas-generating additive may be added to the compressible cement composition, inter alia, by dry blending it with hollow particles or by injection into the compressible cement composition as a liquid suspension while the compressible cement composition is being pumped into the subterranean formation. Where a gas-generating additive in particulate form is used, aluminum powder, gypsum blends, and deadburned magnesium oxide may be employed. Gas-generating additives comprising aluminum powder are commercially available under the trade names "GAS-CHEK®" and "SUPER CBL" from Halliburton Energy Services of Duncan, Oklahoma. Certain of such gas-generating additives are described in U.S. Pat. Nos. 4,304,298; 4,340,427; 4,367,093; 4,450,010 and 4,565,578, which are assigned to the assignee of the present application and are incorporated herein by reference.

In certain other embodiments of the present invention wherein a foamed cement composition is used, such foamed cement composition may comprise a gas that is added to the cement composition at the surface. For instance, where a cement composition used in the present invention is foamed by the direct injection of gas into the composition, the gas utilized can be air or any suitable inert gas, such as nitrogen, or even a mixture of such gases. Where foaming is achieved by direct injection of gas, the gas may be present in the compressible cement composition in an amount sufficient to foam the composition, generally in an amount in the range of from about 0.01% to about 60% by volume of the compressible cement composition.

Optionally, the compressible cement compositions useful with the present invention further may comprise additional suitable additives. For example, the compressible cement compositions useful with the present invention optionally may comprise, inter alia, fluid loss agents, weighting materials, accelerants, retarders, and the like. If an accelerant is used, such accelerant may be calcium chloride, and may be present in an amount in the range from about 1.0% to about 2.0% by weight of the cement in the compressible cement compositions. Fluid loss additives such as, but not limited to, hydroxyethylcellulose, carboxymethylcellulose, carboxymethylhydroxyethylcellulose, hydroxypropylcellulose, hydroxypropylguar, guar, polyvinylalcohol, or polyvinylacetate also may be suitable. In certain embodiments of the present invention where a compressible cement composition is formed by direct injection of a gas or mixture of gases into a cement composition, a surfactant also may be included. Any commercially available surfactant may be used. An example is "ZONESEAL 2000™," commercially available from Halliburton Energy Services, Inc., which is described in U.S. Pat. No. 6,063,738, the relevant disclosure of which is incorporated herein by reference.

Therefore, the present invention is well adapted to carry out the objects and attain the ends and advantages mentioned as well as those that are inherent therein. While the invention has been depicted and described with reference to embodiments of the invention, such a reference does not imply a limitation on the invention, and no such limitation is to be inferred. The invention is capable of considerable modification, alternation, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method of cementing casing in a well bore, the method comprising:
   flowing a first cement composition in a reverse circulation direction into an annulus defined between the casing and the well bore, the first cement composition comprising a compressible cement composition;
   flowing a second cement composition into the inner diameter of the casing;
   pumping the second cement composition from the inner diameter of the casing into the annulus, wherein the first cement composition is compressed by the pumping; and
   permitting the first and second cement compositions to set within the annulus.

2. The method of claim 1, wherein the first cement composition comprises a foamed cement composition.

3. The method of claim 1, wherein the first cement composition comprises a gas-generating additive.

4. The method of claim 1, wherein the first cement composition comprises a gas.

5. The method of claim 1, wherein the first cement composition comprises aluminum powder.

6. The method of claim 1, wherein the first cement composition comprises azodicarbonamide.

7. The method of claim 1, wherein the second cement composition comprises a compressible cement composition.

8. The method of claim 1, wherein the flowing a second cement composition into the inner diameter of the casing comprises flowing in a reverse-circulation direction.

9. The method of claim 1, wherein the flowing a second cement composition into the inner diameter of the casing comprises flowing in a conventional-circulation direction.

10. The method of claim 1, wherein the second cement composition comprises a foamed cement composition.

11. The method of claim 1, wherein the second cement composition comprises a gas-generating additive.

12. The method of claim 1, wherein the second cement composition comprises a gas.

13. The method of claim 1, wherein the second cement composition comprises aluminum powder.

14. The method of claim 1, wherein the second cement composition comprises azodicarbonamide.

15. The method of claim 1, wherein the second cement composition comprises an incompressible cement composition.

16. The method of claim 1, wherein the pumping the second cement composition from the inner diameter of the casing into the annulus comprises pushing a wiper plug down the inner diameter of the casing.

17. The method of claim 1, wherein the pumping the second cement composition from the inner diameter of the casing into the annulus comprises pushing a wiper plug down the inner diameter of the casing with a work string.

18. The method of claim 1, wherein the pumping the second cement composition from the inner diameter of the casing into the annulus comprises pushing a wiper plug down the inner diameter of the casing by pressurizing the inner diameter of the casing behind the wiper plug.

19. The method of claim 1, further comprising locking a wiper plug in the inner diameter of the casing, whereby the second cement composition is retained in the annulus.

20. The method of claim 1, wherein the casing comprises a plurality of casing strings, wherein the flowing a first cement composition in a reverse circulation direction into an annulus comprises flowing into a plurality of annuluses defined between the plurality of casing strings and the well bore; wherein the flowing a second cement composition into the inner diameter of the casing comprises flowing into the inner diameters of the plurality of casing strings; and wherein the pumping the second cement composition from the inner diameter of the casing into the annulus comprises pumping from the inner diameters of the plurality of casing strings into the plurality of annuluses.

21. A method of cementing casing in a well bore, the method comprising:
   flowing a first cement composition in a reverse circulation direction into an annulus defined between the casing and the well bore, the first cement composition comprising a variable-density cement composition;
   flowing a second cement composition into the inner diameter of the casing;
   pumping the second cement composition from the inner diameter of the casing into the annulus, wherein the first cement composition is reduced in volume by the pumping; and
   permitting the first and second cement compositions to set in the annulus.

22. The method of claim 21, wherein the flowing a second cement composition into the inner diameter of the casing comprises flowing in a reverse-circulation direction.

23. The method of claim 21, wherein the flowing a second cement composition into the inner diameter of the casing comprises flowing in a conventional-circulation direction.

24. The method of claim 21, wherein the pumping the second cement composition from the inner diameter of the casing into the annulus comprises pushing a wiper plug down the inner diameter of the casing.

25. The method of claim 21, wherein the pumping the second cement composition from the inner diameter of the casing into the annulus comprises pushing a wiper plug down the inner diameter of the casing by pressurizing the inner diameter of the casing behind the wiper plug.

26. The method of claim 21, further comprising locking a wiper plug in the inner diameter of the casing, whereby the second cement composition is retained in the annulus.

27. A method of cementing casing in a well bore, the method comprising:
   flowing a first cement composition into an annulus defined between a plurality of casing strings and the well bore, the first cement composition comprising a compressible cement composition;
   flowing a second cement composition into the inner diameters of the plurality of casing strings; and
   pumping the second cement composition from the inner diameters of the plurality of casing strings into the annulus, wherein the pumping comprises pushing a plurality of wiper plugs through the plurality of casing strings, wherein the first cement composition is compressed by the pumping.

28. The method of claim 27, wherein the flowing a first cement composition into the annulus comprises flowing the first cement composition into the annulus in a reverse-circulation direction.

29. The method of claim 27, wherein the flowing a first cement composition into the annulus comprises flowing the first cement composition into the annulus in a conventional-circulation direction.

30. The method of claim 27, wherein the first cement composition comprises a foamed cement composition.

31. The method of claim 27, wherein the first cement composition comprises a gas-generating additive.

32. The method of claim 27, wherein the first cement composition comprises a gas.

33. The method of claim 27, wherein the first cement composition comprises aluminum powder.

34. The method of claim 27, wherein the first cement composition comprises azodicarbonamide.

35. The method of claim 27, wherein the second cement composition comprises a compressible cement composition.

36. The method of claim 27, wherein the flowing a second cement composition into the inner diameters of the plurality of casing strings comprises flowing in a reverse-circulation direction.

37. The method of claim 27, wherein the flowing a second cement composition into the inner diameters of the plurality of casing strings comprises flowing in a conventional-circulation direction.

38. The method of claim 27, wherein the second cement composition comprises a foamed cement composition.

39. The method claim 27, wherein the second cement composition comprises a gas-generating additive.

40. The method of claim 27, wherein the second cement composition comprises a gas.

41. The method of claim 27, wherein the second cement composition comprises aluminum powder.

42. The method of claim 27, wherein the second cement composition comprises azodicarbonamide.

43. The method of claim 27, wherein the second cement composition comprises an incompressible cement composition.

44. The method of claim 27, wherein the pumping the second cement composition from the inner diameters of the plurality of casing strings into the annulus comprises pushing a wiper plug down an inner diameter a the casing of the plurality of casing strings.

45. The method of claim 27, wherein the pumping the second cement composition from the inner diameters of the plurality of casing strings into the annulus comprises pressurizing an inner diameter of one of the casing strings of the plurality of casing strings.

46. The method of claim 27, further comprising locking a wiper plug in the inner diameter of the casing, whereby the second cement composition is retained in the annulus.

* * * * *